United States Patent [19]
Smiecinski et al.

[11] Patent Number: 5,830,926
[45] Date of Patent: Nov. 3, 1998

[54] FLAME RETARDANT POLYURETHANE FOAMS

[75] Inventors: Theodore M. Smiecinski, Woodhaven; Steven E. Wujcik, Romulus; Donald C. Mente, Grosse Ile, all of Mich.

[73] Assignee: BASF Corporation, Mt. Olive, N.J.

[21] Appl. No.: 991,996

[22] Filed: Dec. 17, 1997

[51] Int. Cl.$^6$ .......................... C08G 18/20; C08G 18/32
[52] U.S. Cl. .......................... 521/128; 521/137; 521/160
[58] Field of Search .................... 521/128, 137, 521/160

[56] References Cited

U.S. PATENT DOCUMENTS

| | | |
|---|---|---|
| 4,258,141 | 3/1981 | Jarre et al. . |
| 4,293,657 | 10/1981 | Nissen et al. . |
| 4,367,294 | 1/1983 | Hahn et al. . |
| 4,454,254 | 6/1984 | Reichel et al. . |
| 4,743,626 | 5/1988 | Narayan . |
| 4,745,133 | 5/1988 | Grinbergs et al. . |
| 4,810,729 | 3/1989 | Davis et al. . |
| 4,826,884 | 5/1989 | Grace et al. . |
| 4,849,459 | 7/1989 | Grace et al. . |
| 4,892,893 | 1/1990 | Grace et al. . |
| 5,114,988 | 5/1992 | Gagnon et al. . |
| 5,338,820 | 8/1994 | Harrison et al. . |
| 5,506,278 | 4/1996 | Walmsley ................ 521/128 |
| 5,536,757 | 7/1996 | Walmsley ................ 521/128 |
| 5,569,682 | 10/1996 | Walmsley ................ 521/128 |
| 5,730,909 | 3/1998 | Smiecinski et al. ....... 521/159 |

*Primary Examiner*—Morton Foelak
*Attorney, Agent, or Firm*—Fernando A. Borrego

[57] ABSTRACT

The invention pertains to flame retardant flexible polyurethane foams prepared by reacting a polyether polyol and an organic isocyanate in the presence of a blowing agent and incorporating melamine and an effective amount of another flame retardant. The organic isocyanate comprises carbodiimide-uretonimine-modified diphenylmehtane diisocyanate and toluene diisocyanate. The polyurethane foams exceed conventional flame retardancy standards and exhibit flame spread index values of less than 25 as measured under flame test procedure ASTM D3675-90.

20 Claims, No Drawings ns and methods for the preparation thereof. More particularly, the present invention relates to the preparation of flexible polyurethane flame-retardant foam compositions which contain an amount of melamine preferably ranging from about 10 weight percent to about 55 weight percent of the total composition in conjunction with an effective amount of an auxiliary flame retardant compound. The polyurethane foam product is prepared by reacting a polyoxyalkylene polyether polyol with an organic isocyanate, wherein the isocyanate comprises a blend of toluene diisocyanate and uretonimine-carbodiimide-modified diphenylmethane diisocyanate.

BACKGROUND OF THE INVENTION

The preparation of flexible polyurethane flame-retardant foam compositions are generally well known as evidenced by the prior art. U.S. Pat. No. 4,022,718 teaches the preparation of high resilience cold-cured polyurethane foams incorporating 2,3-dibromo-1,4-butenediol as a chain extender and flame-retardant component. U.S. Pat. No. 4,147,847 teaches a method of preparing flexible, flame-retarded, polyurethane foams by employing specific foam stabilizers which reduce the required amount of normal flame-retardant additives. U.S. Pat. No. 4,162,353 teaches the preparation of flexible polyurethane foams incorporating therein a halo-substituted alkyl phosphate such as, for example, tris(2-chlorethyl)-phosphate such as, for example, tris(2-chlorethyl)-phosphate and an unsubstituted trialkl-phosphate such as, for example, triethylphosphate.

U.S. Pat. No. 4,849,459, the disclosure of which is incorporated herein by reference, describes a flame retardant flexible polyurethane foam comprising the reaction product of a polyether polyol and a toluene diisocyanate and incorporating melamine and another flame retardant. These polyurethane foams exhibit significant flame retardancy as displayed by the foam products passing both the Radiant Panel Test ASTM E162-81a and the California 133 test. However, for certain applications it is necessary for a polyurethane foam to exceed the requirements of these tests and provide even higher flame retardancy. For example, foam products used in the common carrier industry must provide flame spread index values below 25 under flame test procedure ASTM D3675-90.

Thus, there remains a need for polyurethane foam products which exhibit very high flame retardancy to the extent that they meet stringent transportation flame spread index required by flame test procedure ASTM D3675-90, providing flame spray index values below 25 on such test. Accordingly, the present invention is directed to preparing flame-retardant polyurethane foam compositions which provide flame spread index values below 25 on the flame test procedure ASTM D3675-90.

SUMMARY OF THE INVENTION

The present invention applies to both high-resiliency, flexible polyurethane foam compositions and conventional flexible polyurethane foam compositions which exhibit improved flame retardancy. The polyurethane foams are prepared by reacting a polyoxyalkylene polyether polyol having at least two active hydrogen atoms and an average equivalent weight of from about 200 to about 2,500 with an organic polyisocyanate in the presence of a catalyst, a blowing agent, a silicone surfactant, and optionally a chain extender. The foam further comprises melamine and an effective amount of another flame retardant compound. The organic isocyanate comprises from about 70 to 85 weight percent carbodiimide-uretonimine-modified diphenylmethane diisocyanate and about 15 to 30 weight percent toluene diisocyanate, based on the weight of the organic isocyanate.

In an alternative embodiment of the present invention, a flame retardant flexible polyurethane foam comprises the reaction product of (a) a polyoxyalkylene polyether polyol having an average equivalent weight of from about 200 to about 2500, wherein dispersed in situ within the polyether polyol is melamine in an amount ranging from about 10 weight percent to about 55 weight percent based on the weight of the foam, and (b) an organic isocyanante. The polyurethane foams are prepared by reacting the polyoxyalkylene polyether polyol with the organic polyisocyanate in the presence of (c) a catalyst, a blowing agent, a silicone surfactant and optionally (d) a chain extender. The foam compositions further comprise (e) an effective amount of auxiliary flame retardant other than melamine. The isocyanate comprises from about 70 to 85 weight percent carbodiimide-uretonimine-modified diphenylmethane diisocyanate and about 15 to 30 weight percent percent toluene diisocyanate, based on the weight of said, organic isocyanate, and the polyol preferably comprises a styrene acrylonitrile graft polymer polyol dispersion.

DETAILED DESCRIPTION OF THE INVENTION

It has unexpectedly been found that in the preparation of flexible flame-retardant polyurethane foams, a mixture of (a) melamine and (b) an effective amount of another flame retardant compound incorporated into a polyoxyalkylene polyether polyol when reacted with a particular blend of organic isocyanates will result in foam which will meet the requirements of California Technical Bulletin 133 test. More importantly, when this particular blend of organic isocyanates is reacted with the polyoxyalklene polyether as described hereinbelow to form a foam composition of the present invention, flame spread index values of less than 25 under ASTM D3675-90 flame test procedure can be achieved.

The polyurethane foams of the present invention comprise melamine in the amount ranging from about 10 to about 55 weight percent, preferably from about 20 to about 40 weight percent, most preferably from about 25 to about 35 weight percent of the total composition in combination with an auxiliary flame retardants in the amount of about 1 to about 15 weight percent, preferably from about 2 to about 10 weight percent of the total composition.

Suitable flame retardant compounds which may be employed in conjunction with melamine are well known in the art and may include tri(2-chloroethyl) phosphate (Fyrol® CEF), tri(2-chloroisopropyl)phosphate (Fyrol® PCF), tri(1,3-dichloroisopropyl)phosphate (Fyrol® FR-2), pentabromodiphenyloxide (DE60F™), chloronated diphosphate ester (Antiblaze® 100), tris(2,3-dibromopropyl)-phosphate, tetrakis(2-chloroethyl) ethylene phosphonate, pentabromodipheny oxide, tris(1,3-dichloropropyl) phosphate, molybdenum trioxide, ammonium molybdate, ammonium phosphate, tricresyl phosphate, 2,3- dibromopropanol, hexabromocyclododecane, and dibromoethyldibromocyclohexane. Mixtures of the above auxiliary flame retardants may be used together with the melamine in the foam compositions of the present invention. The Fyrol® series of flame retardant compounds are commercially available from Akzo Nobel Chemicals Inc. of Dobbs Ferry, N.Y. The DE60F™ flame retardant compound is commercially available from Great Lakes Chemical Corporation of West Lafayette, Ind. The Antiblaze® 100 flame retardant compound is commercially available from Albright & Wilson of Richmond, Va.

Representative polyols which may be employed in the preparation of the flame retardant polyurethane foams are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 100 to 10,000, preferably from 200 to 2500.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacid acid, brassylic acid, thapsic acid, maleic acid fumaric acid, glutaconic acid, α-hydromuconic acid, α-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetrio, α-methyl glycoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example the process disclosed by Wurtz in 1859 and Encyclopedia of Chemical Technology, Vol. 7, pp. 257–262, published by Interscience Publishers, Inc. (1951) or in U.S. Pat. No. 1,922,459. Polyethers which are preferred include the alkylene oxide addition products of trimethylolpropane, glycerin, pentaerythritol, sucrose, sorbitol, propylene glycol, and ,2'(4,4'-hydroxyphenyl) propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6- 3,4- 2,5- and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of tan alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541; and 3,639,542.

Other polyols which may be employed have incorporated therein vinylic polymers. These polyols may be prepared (1) by the in situ free-radical polymerization of an ethylenically unsaturated monomer or mixture of monomers in a polyol, or (2) by dispersion in a polyol of a performed graft polymer prepared by free-radical polymerization in a solvent such as described in U.S. Pat. Nos. 3,931,092; 4,014,846; 4,093,573; and 4,122,056, the disclosures of which are incorporated herein by reference, or (3) by low temperature polymerization in the presence of chain transfer agents. These polymerizations may be carried out at a temperature between 65° C. and 170° C., preferably between 75° C. and 135° C.

The polyols which may be employed in the preparation of the graft polymer dispersions are well known in the art. Both conventional polyols essentially free from ethylenic unsaturation such as those described in U.S. Reissue Pat. No. 28,715 and unsaturated polyols such as those described in U.S. Pat. No. 3,652,659 and Reissue No. 29,014 may be employed in preparing the graft polymer dispersions used in the instant invention, the disclosures of which are incorporated by reference.

The polyurethane foams employed in the present invention are generally prepared by the reaction of a polyoxyalkylene polyether polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Pat. No. Re. 24,514, the disclosure of which is incorporated herein by reference, together with suitable machinery to be used in conjunction therewith. When water is added as the blowing agent, corresponding quantities of excess isocyanate may be used to react with the water and produce carbon dioxide. It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethane. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

A first organic polyisocyanate which is employed in the present invention is a toluene diisocyanate. Representative toluene diisocyanate include 2,4-toluene diisocyanate, 2,6-toluene diisocyanate, and mixtures of 2,4- and 2,6-toluene diisocyanate. A preferred toluene diisocyanate is a mixture of 80% by weight 2,4- and 20% by weight 2,6-toluene diisocyanate.

A second organic isocyanate employed in the present invention includes a carbodiimide-uretonimine-modified diphenylmethane diisocyanate. The carbodiimide and uretonimine structure is shown below.

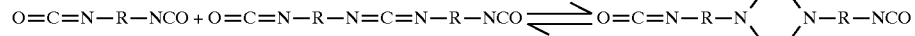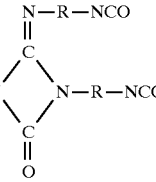

The carbodiimide-uretonimine-modified diphenylmethane diisocyanate of the present invention may be prepared by employing well known carbodiimide-promoting compounds as catalysts. The carbodiimide catalysts employed in accordance with the present invention may be any of those known in the art as being useful in the conversion of an isocyanate to the corresponding carbodiimide. U.S. Pat. No. 4,743,626, the disclosure of which is incorporated herein by reference, describes suitable catalysts which are useful herein. Preferred catalysts include phospholene 1-oxides and 1-sulfides having the formulae:

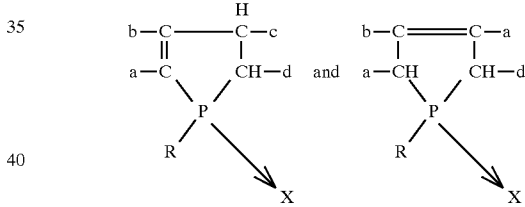

wherein a, b, c and d are each selected from the group consisting of hydrogen and hydrocarbyls from 1 to 12 carbon atoms inclusive, R is selected from the group consisting of lower alkyl and aryl and X is selected from the group consisting of oxygen and sulfur. The above phospholene compounds and methods for their preparation are described in U.S. Pat. Nos. 2,663,737; 2,663,738; and 2,853,473. The 3-phospholenes can be isomerized readily to the corresponding 2-phospholenes by thermal treatment or by refluxing with an aqueous base as disclosed by Quinn et al, Journal American Chemical Society, 33, 1024, 1968. Representative compounds within the above class are 1-phenyl-2-phospholene-1-oxide; 3-methyl-1-phenyl-2-phospholene-1-oxide; 1-phenyl-2-phospholene-1-sulfide; 1-ethyl-phospholene-1-oxide; 1-ethyl-3-methyl-2-phospholene-1-oxide; 1-ethyl-3-methyl-2-phospholene-1-sulfide; and the isomeric phospholanes corresponding to the above-named compounds. Also, polymer bound phospholene oxide may be employed, specifically those having the recurring units, for example,

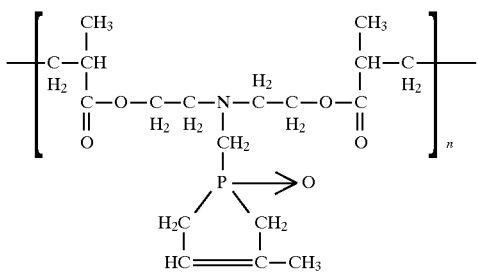

as disclosed in U.S. Pat. No. 4,105,643, as well as those of the following structure as disclosed in U.S. Pat. No. 4,105,642:

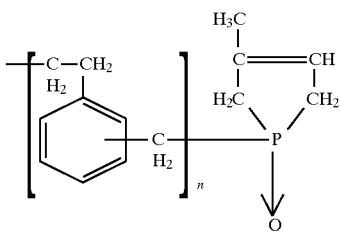

Other suitable catalysts are set forth in the above-referenced U.S. Pat. No. 4,743,626.

The temperature ranges which may be employed for the carbodiimide-uretonimine formation reactions range from 50° C. to 250° C. and preferably from 60° C. to 230° C.

The reaction product may be treated at the reaction temperature or lower with catalyst deactivators which include salts such as magnesium chloride dihydrate, acid chlorides such as benzolyl chlorides and acetyl chlorides, acides such as hydrochloric acid, oxalic acid, phosporicacid, benzenesulfonic acid, toluenesulfonic acid, methanesulfonic acid or trifluoromethane sulfonic acid, sulfonyl chlorides such as benzenesulfonyl chloride, toluenesulfonyl chloride and the like. Other deactivators which may be employed are such agents as dimethylsulfate, alkyl o,p-toluenesulfonates, methylchloride and similar compounds as disclosed in U.S. Pat. No. 3,769,318.

The organic isocyanate of the present invention comprises a blend of carbodiimide-uretonimine-modified diphenylmethane diisocyanate and toluene diisocyanate. Carbodiimide-uretonimine-modified diphenylmethane diisocyanate is present in amount of from about 70 to 85 weight percent, preferably from about 75 to 80 weight percent, based on the weight of the organic isocyanate. The toluene diisocyanate is present in the organic isocyanate blend in an amount from about 15 to 30 weight percent, preferably from about 20 to 25 weight percent, based on the weight of the organic isocyanate.

Limited amounts of other organic isocyanates may be included in the isocyanate blend which is reacted with the polyether polyol to produce the polyurethane foams of the present invention. For example, crude polyisocyanates, such as crude toluene diisocyanate obtained by the phosgenation of a mixture of toluene diamines or crude diphenylmethane isocyanate obtained by the phosgenation of crude diphenylmethane diamine, may be included in the isocyanate blend. Preferred crude isocyanantes are disclosed in U.S. Pat. No. 3,215,652. Other isocyanates which may be incorporated in the organic polyisocyanate blend include hexamethylene diisocyanate, tetramethylene diisocyanante, cyclohexane-1,4-diisocyanante, hexahydrotoluene diisocyanate (and isomers), naphthalene-1,5-diisocyanante, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. However, when these auxiliary isocyanates are included in the isocyanate blend, they generally comprise no more than about 15 weight percent based on the organic isocyanate.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)-ethylenediamine, N,N'-di(2-hydroxypropyl) ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

The polyurethane foams of the present invention exhibit flame-spread index values of less than about 25 under flame test procedure ASTM D3675-90. This test, well-known to those skilled in the art, measures the surface flammability of flexible cellular materials using a radiant heat energy source. A flame spread rating is assigned for a given application as determined by the regulating body overseeing compliance. For example, the New York/New Jersey Port Authority requires flame spread index scores as measured by ASTM D3675-90 of less than 100 for cushioning materials used in upholstered furnishing applications. Thus, the foam compositions of the present invention provide flame retardancy sufficient for most applications, including those requiring unusually high levels of flame retardancy such as required for mas transit seating applications.

The following examples are offered to illustrate the general nature of the invention. Those skilled in the art will appreciate that they are not limiting to the scope and spirit of the invention and various and obvious modifications will occur to those skilled in the art. All parts are by weight unless otherwise stated.

The following materials were used in the examples below:

Polyol A is a graft polyol of propylene oxide/ethylene oxide adduct of glycerin containing 5 to 25 weight percent ethylene oxide in situ with 1 to 50 weight percent of styrene acrylonitrile graft dispersion.

Polyol B is a polyether polyol of propylene oxide/etylene oxide adduct of glycerin containing 5 to 25 weight percent ethylene oxide with a hydroxyl number of 10 to 60.

DEOA is diethanolamine.

DC-5164 is a silicone surfactant manufactured by AIR PRODUCTS.

Catalyst A is a 3/1 blend of DABCO® 33LV catalyst (AIR PRODUCTS) and NIAX® A-1 catalyst (Union Carbide).

Catalyst B is DABCO® T-12 catalyst (AIR PRODUCTS).

Fyrol® FR-2 is a tri(1,3-dichloroisopropyl)phosphate manufactured by AKZO Chemical.

TDI is toluene diisocyanate.

Isocyanate A is a blend of 77.5 weight percent carbodiimide-uretonimine-modified diphenylmethane diisocyanate and 22.5 weight percent toluene diisocyanate.

EXAMPLES 1–4

Examples 1–4 were prepared on a Hennecke UBT-63 machine by employing the following procedure:

A resin blend composed of polyols A and B, melamine, pigment, and ⅓ of the DEOA LF in the proportions listed, is charged into a 120-gallon tank equipped with a turbine blade agitator turning at 60 rpm and agitated for about 24 hours at 90° F. after passing through a inline high shear mixer prior to foaming. This polyol/melamine slurry and the other urethane components are metered in separate streams into a low pressure pour-head with a pin mixer rotating at 5400 rpm. The reacting mixture is then dispensed onto a moving conveyor. The dispensed liquid mixture begins to cream then expand, shaped by the moving conveyor and static side walls. This continuous reacting foaming operation is allowed to run until a 15-foot block length of foam is made. The foam expands to its full height in about three minutes. The foam block is then allowed to cure for a minimum 72 hours at ambient conditions after which standard test pads are cut for physical property testing.

In the examples, the physical properties of the polyurethane foam are determined by the ASTM D3574-91 Standard test Methods for Flexible Cellular Materials—Slab, Bonded and Molded Urethane Foams. Additional tests include the California Technical Bulletin 117 Test, California Technical Bulletin 133 Test, British Standard 5852 Part 2: crib 5, and the Radiant Panel Test ASTM 3675-90.

TABLE 1

| Examples | 1 | 2 | 3 | 4 |
|---|---|---|---|---|
| FORMULATION, PBW | | | | |
| Polyol A | — | 20.0 | 20.0 | 20.0 |
| Polyol B | 100.0 | 80.0 | 80.0 | 80.0 |
| DEOA LF | 1.5 | 1.5 | 1.5 | 1.5 |
| Pigment | 0.22 | 0.22 | 0.22 | 0.22 |
| Melamine | 80.0 | 80.0 | 80.0 | 80.0 |
| Water | 3.17 | 1.67 | 3.17 | 1.67 |
| DC-5164 Silicone Surfactant | 1.20 | 0.80 | 1.20 | 0.80 |
| Catalyst A | 0.15 | 0.50 | 0.15 | 0.38 |

TABLE 1-continued

| Examples | 1 | 2 | 3 | 4 |
|---|---|---|---|---|
| Catalyst B | 0.10 | 0.10 | 0.10 | 0.10 |
| Fyrol FR-2 | 8.00 | 8.00 | 8.00 | 8.00 |
| TDI | — | — | 40.34 | 25.11 |
| Isocyanate A | 57.35 | 35.70 | — | — |
| PHYSICAL PROPERTIES | | | | |
| Density, PCF | 3.01 | 5.20 | 2.72 | 5.15 |
| Tensile, PSI | 14.9 | 14.5 | 10.8 | 11.8 |
| Elongation, % | 140 | 120 | 137 | 130 |
| Tear, PI | 1.7 | 1.6 | 1.8 | 1.9 |
| Resilience, % | 52 | 59 | 54 | 66 |
| IFD, lbs/50 sq. in. (4 inch) | | | | |
| 25% | 26.6 | 36.4 | 26.0 | 39.1 |
| 65% | 78.8 | 124.3 | 64.1 | 128.5 |
| Support Factor | 2.91 | 3.42 | 2.40 | 3.29 |
| Humid Aged 3 hrs. at 220° F. | | | | |
| CFD, % of Original 50% | 87 | 76 | 102 | 84 |
| Compression sets, % set 75% | 26 | 9 | 13 | 10 |
| Airflow, CFM | 0.5 | 0.8 | 0.8 | 1.2 |
| FLAMMABILITY PROPERTIES* | | | | |
| MVSS-302 | Pass | Pass | Pass | Pass |
| Cal T.B. 117 Open Flame | Pass | Pass | Pass | Pass |
| Cal T.B. 117 Cigarette Smoldering | Pass | Pass | Pass | Pass |
| % wt. retained(min. 80.0%) | 99.9 | 99.8 | 99.5 | 99.7 |
| BS5852 Pt2 Crib 5** (FR Polyester Fabric) | Pass | Pass | Pass | Pass |
| Flame Out Time, Min:Sec | 2:45 | 3:48 | 6:27 | 4:57 |
| Weight Loss, grams | 26.6 | 18.4 | 22.0 | 22.2 |
| California T.B. 133*** | Pass | Pass | Pass | Pass |
| Weight Loss, lbs | 1.7 | 0.1 | 0.1 | 0.2 |
| ASTM D3675 Radiant Panel Flame Spread Index | 10 | 7 | 67 | 30 |

*This numerical flame spread rating, as in other tests of flammability, is not intended to reflect hazards presented by this or any other material under actual fire conditions.
**Average of two crib burns.
***Mock-up chair cushions covered with 55%/45% wool/nylon upholstery fabric.

We claim:

1. A method of producing a flame retardant flexible polyurethane foam article comprising reacting:
   (a) a polyoxyalkylene polyether polyol having an average equivalent weight of from about 200 to about 2500, and
   (b) an organic isocyanate
   in the presence of
   (c) a catalyst, a blowing agent, a surfactant, and
   (d) optionally a chain extender,
   and further in the presence of:
   (e) melamine in an amount ranging from about 10 weight percent to about 55 weight percent based on the weight of the foam, and
   (f) an effective amount of an auxiliary flame retardant other than melamine,
   wherein said organic isocyanate comprises from about 70 to 85 weight percent carbodiimide-uretonimine-modified diphenylmethane diisocyanate and about 15 to 30 weight percent toluene diisocyanate, based on the weight of said organic isocyanate.

2. A method as recited in claim 1 wherein said auxiliary flame retardant is employed in an amount ranging from about 1 weight percent to about 15 weight percent of the foam article.

3. A method as recited in claim 1 wherein the polyether polyol is a blend of a propylene oxide, ethylene oxide adduct of glycerine containing about 5 to 25 weight percent ethylene oxide and a propylene oxide adduct of propylene glycol containing about 1 to 50 weight percent of styrene acrylonitrile graft dispersion.

4. A method as recited in claim 3 wherein the glycerine based polyol is about 10 to 95 weight percent of the polyol blend.

5. A method as recited in claim 1 wherein the amount of melamine ranges from about 25 to about 35 weight percent of the foam article.

6. A method as recited in claim 1 wherein said flame retardant is selected from the group consisting of Fyrol® CEF (tri(2-chloroethyl) phosphate), Fyrol® PCF (tri(2-chloroisopropyl)phosphate), Fyrol® FR-2 (tri(1,3-dichloroisopropyl)phosphate), DE60F™ (pentabromodiphenyl oxide), Antiblaze® 100 (chloronated diphosphate ester), and mixtures thereof.

7. A method as recited in claim 1 wherein said foam article is a high resiliency foam article.

8. A method of producing a flame retardant flexible polyurethane foam article comprising
(a) dispersing melamine, in an amount ranging from about 10 weight percent to about 55 weight percent based on the weight of the foam article, in situ in a polyoxyalkylene polyether polyol having an average equivalent weight of from about 200 to about 2500; and
(b) reacting said polyether polyol with an organic isocyanante in the presence of a catalyst, a blowing agent, a silicone surfactant; and optionally a chain extender; and an effective amount of an auxiliary flame retardant other than melamine;
wherein said polyether polyol comprises a styrene acrylonitrile graft polymer polyol dispersion and said isocyanate comprises from about 70 to 85 weight percent carbodiimide-uretonimine-modified diphenylmethane diisocyanate and about 15 to 30 weight percent toluene diisocyanate, based on the weight of said organic isocyanate.

9. A method as recited in claim 8 wherein said graft polymer polyol dispersion is prepared by the in situ free-radical polymerization of an ethylenically unsaturated monomer or mixture of monomers in a polyol.

10. A method as recited in claim 8 wherein said polymer dispersion is prepared by the dispersion of a performed graft polymer into a polyol.

11. A method as recited in claim 8 wherein said polyol comprises a mixture of at least one conventional polyether polyol and a least one graft polymer polyol dispersion.

12. A method as recited in claim 8 wherein the auxiliary flame retardant is employed in an amount ranging from about 2 to about 10 weight percent of the foam article and the amount of melamine ranges from about 25 to about 35 weight percent of the foam article.

13. A method as recited in claim 8 wherein said foam article is a high resiliency foam article.

14. A method of producing flame retardant flexible polyurethane foam article comprising reacting:
(a) a polyoxyalkylene polyether polyol having an average equivalent weight of from about 200 to about 2500, and
(b) an organic isocyanate comprising from about 70 to 85 weight percent carbodiimide-uretonimine-modified diphenylmethane diisocyanate and about 15 to 30 weight percent toluene diisocyanate, based on the weight of said organic isocyanate;
in the presence of
(c) a catalyst, a blowing agent, a surfactant, and
(d) optionally a chain extender,
and further in the presence of:
(e) melamine in the amount ranging from about 20 to about 40 weight percent based on the weight of the foam article, and
(f) an auxiliary flame retardant other than melamine in an amount ranging from about 1 to about 15 weight percent based on the weight of the foam article;
wherein said foam exhibits flame spread index values of less than about 25 under flame test procedure ASTM D3675-90.

15. A method as recited in claim 14 wherein the polyether polyol is a blend of a propylene oxide, ethylene oxide adduct of glycerine containing about 5 to 25 weight percent ethylene oxide and a propylene oxide adduct of propylene glycol containing about 1 to 50 weight percent of styrene acrylonitrile graft dispersion.

16. A method as recited in claim 15 wherein the glycerine based polyol is about 10 to 95 weight percent of the polyol blend.

17. A method as recited in claim 16 wherein the amount of melamine ranges from about 25 to 35 weight percent of the foam article.

18. A method as recited in claim 14 wherein said flame retardant is selected from the group consisting of Fyrol® CEF (tri(2-chloroethyl) phosphate), Fyrol® PCF (tri(2-chloroisopropyl)phosphate), Fyrol® FR-2 (tri(1,3-dichloroisopropyl)phosphate), DE60F™ (pentabromodiphenyl oxide), Antiblaze® 100 (chloronated diphosphate ester), and mixtures thereof.

19. A method as recited in claim 14 wherein said melamine is dispersed in situ within the polyether polyol in an amount ranging from about 25 weight percent to about 35 weight percent based on the weight of the foam article.

20. A method as recited in claim 14 wherein said foam article is a high resiliency foam article.

* * * * *